J. STRAUB & H. STEINHILBER.
APPARATUS FOR TRANSPORTING COLD AND HOT VICTUALS.
APPLICATION FILED MAR. 23, 1908.

909,252.

Patented Jan. 12, 1909.

3 SHEETS—SHEET 1.

WITNESSES:
John E. Heller
M. E. Rollwage

INVENTORS
Jacob Straub
Herman Steinhilber
BY Abraham Knobel
ATTORNEY.

J. STRAUB & H. STEINHILBER.
APPARATUS FOR TRANSPORTING COLD AND HOT VICTUALS.
APPLICATION FILED MAR. 23, 1908.
909,252.
Patented Jan. 12, 1909.
3 SHEETS—SHEET 2.
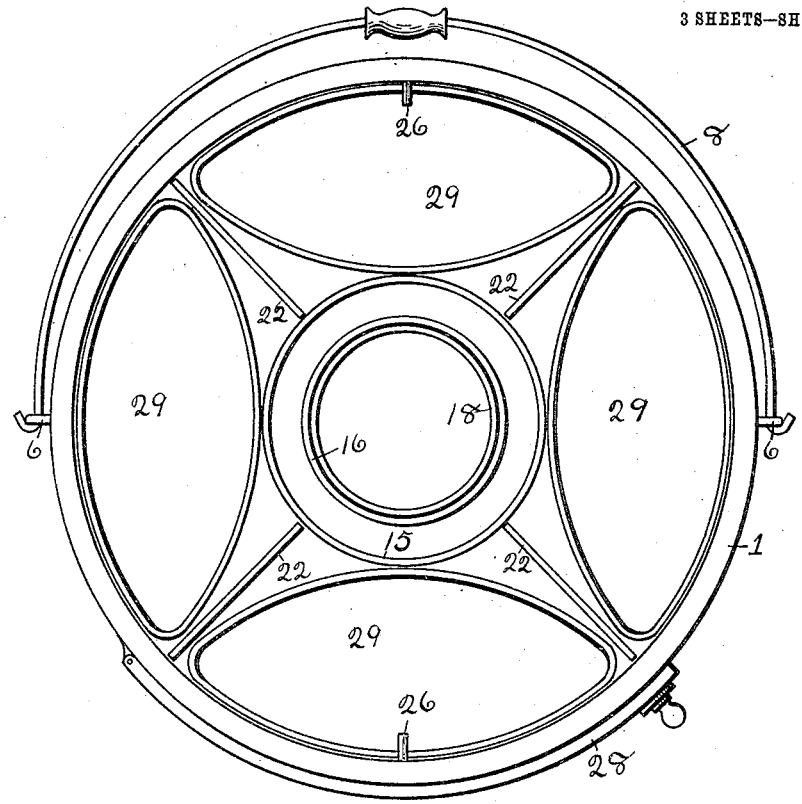
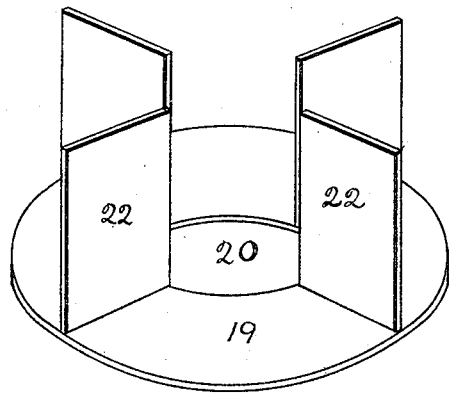
Fig. 3
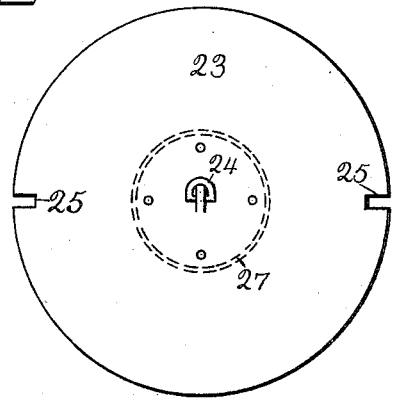
WITNESSES:
John E. Heller,
M. E. Rollwage
Fig. 4.
Fig. 5.
INVENTORS
Jacob Straub,
Herman Steinhilber,
BY Abraham Knobel
ATTORNEY.

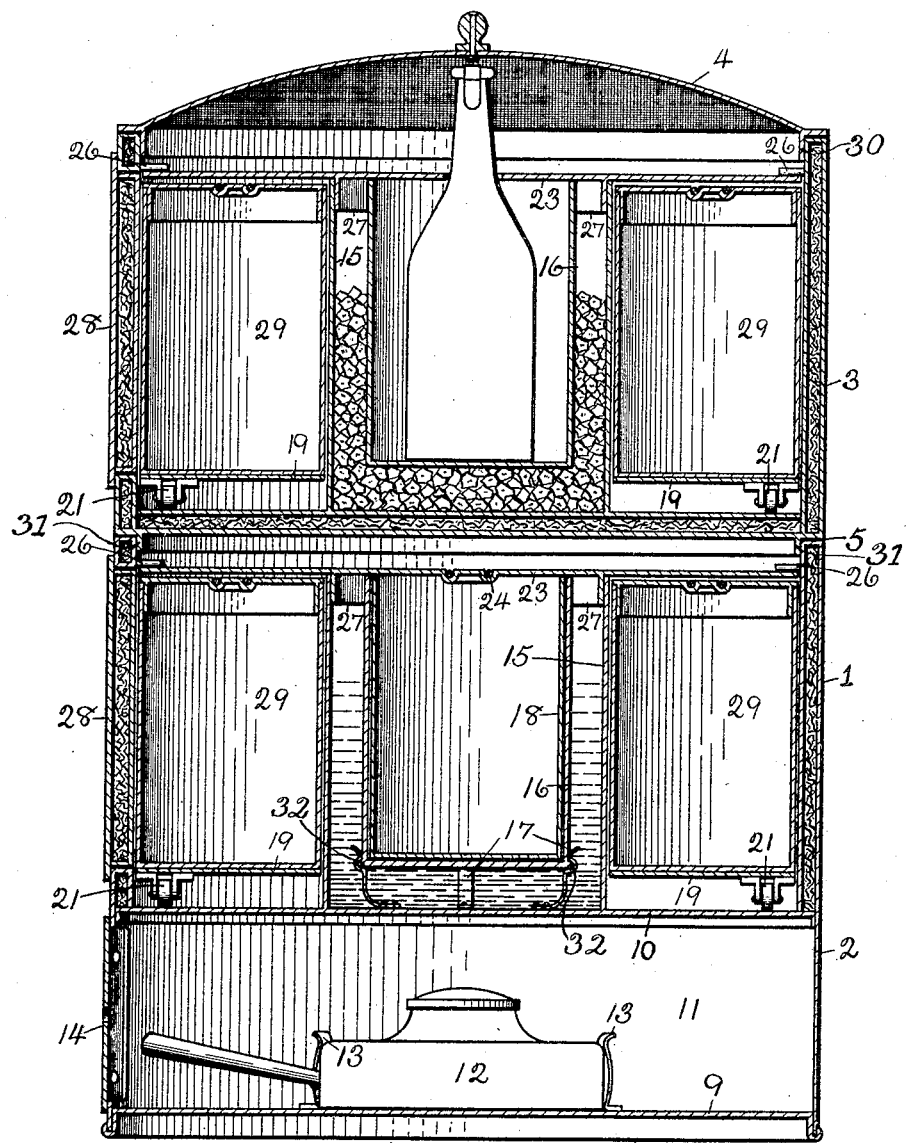

UNITED STATES PATENT OFFICE.

JACOB STRAUB AND HERMAN STEINHILBER, OF LOUISVILLE, KENTUCKY.

APPARATUS FOR TRANSPORTING COLD AND HOT VICTUALS.

No. 909,252.  Specification of Letters Patent.  Patented Jan. 12, 1909.

Application filed March 23, 1908. Serial No. 422,708.

*To all whom it may concern:*

Be it known that we, JACOB STRAUB, a citizen of the United States, and HERMAN STEINHILBER, a subject of the Emperor of Germany, residing at Louisville, in the county of Jefferson and State of Kentucky, have invented a new and useful Apparatus for Transporting Cold and Hot Victuals, of which the following is a specification.

This invention relates to apparatus for transporting cold and hot victuals and beverages, and the objects of our improvement are, to provide hotels and restaurants with convenient means for delivering hot and cold meals in good condition, to provide means for tourists and those traveling for recreation or business for keeping victuals and beverages in good condition, and means for easily and quickly warming and cooling such articles, inexpensiveness of construction, ornamental appearance, so that the apparatus may be set upon a decorated dining table and not detract from the general comeliness, ease of manipulation and durability.

These objects we attain by means of the apparatus illustrated in the accompanying drawings, in which—

Figure 1:
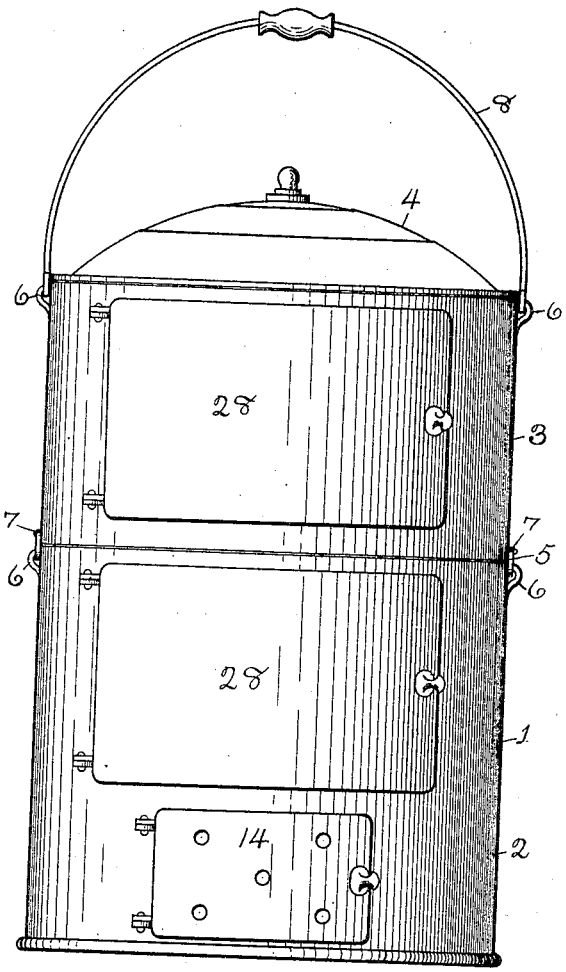
Figure 2:
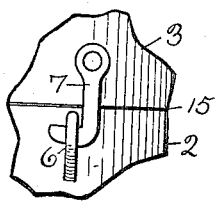

Figure 1 is an elevation; Fig. 2, a detail view of the hook and ear for connecting the parts; Fig. 3, a plan view with the covers removed; Fig. 4, a perspective view of the rotatable platform for the casseroles; Fig. 5, a plan view of a cover; and, Fig. 6, a vertical central section.

Similar reference numerals refer to similar parts throughout the several views of the drawings.

The body or casing 1 is preferably cylindrical in form and in two or more parts. We have illustrated it as comprising two divisions, a lower division 2 and an upper division 3. The body 1 is surmounted by a lid 4. The lid 4 has a cylindrical rim 30 which fits on the inside of the upper edge of the body in a well known manner. The divisions 2 and 3 are separable at 5, so that access may be had to the inside of the lower division from the top, or the lower division may be used without the upper, if only hot victuals are required. When only the lower division is used, the lid 4 is placed on it, being adapted to fit in the same way that it fits upon the upper division. The upper division 3 is provided on its bottom with a cylindrical rim 31, similar to that of lid 4, so that it makes a tight joint with the casing of the lower division. Ears 6 are provided on division 2, and corresponding coupling-hooks 7 at the lower edge of division 3, by means of which the two divisions may be held firmly together.

A bail 8 is provided for carrying the apparatus. Ears 6 are also provided at the upper edge of division 3. In these ears, bail 8 is hooked, or a third division may be added above division 3 and the ears used with corresponding hooks on the lower part of that division. When the lower division only is used, bail 8 may be hooked into its ears 6. One of the divisions, preferably the lower division 2, is provided with a permanent bottom 9 and a permanent top 10, making with the cylindrical casing a closed cylinder, 11. The cylinder 11 is provided with a lamp or heater 12, which is secured in a lamp or heater 12. The wall and bottom spring brackets 13. The wall and bottom of the cylinder may be suitably perforated to admit air for the lamp. The wall of cylinder 11 is provided with a door 14 through which the lamp 12 is accessible. The top 10 of cylinder 11 is provided with a cylindrical cup 15 over its central portion, which is made water tight and serves as a boiler. The boiler 15 extends upward nearly to the top of division 2, and is made of thin sheet metal to adapt it to radiate heat from the water or other heat-conveying liquid contained therein. A second cup 16, somewhat smaller in diameter and shorter than boiler 15, is placed within boiler 15, so that its bottom is some distance from the bottom of boiler 15 and its upper edge is flush with the upper edge of the boiler. Spring clips 17 are secured to the bottom of boiler 15 and provided with notches, into which a flange 32 on the bottom of cup 16 fits and by which the cup is firmly held in place. With this arrangement, it will be seen, a space is left between the walls and bottom of boiler 15 and cup 16 for water. In cup 16 may be placed a receptacle 18, such as a bucket or cup, for soup to be kept hot.

The cylindrical body 1 of the apparatus is provided with double walls, and a non-conducting material such as asbestos or hair between the walls, in order that the heat radiated from boiler 15 may be retained.

A circular platform 19, provided with a central perforation 20, rollers 21, and vertical partitions 22, is placed within the casing or body 1, so that rollers 21 rest upon top 10 and the platform with its partitions surrounds boiler 15. Platform 19 is thus adapted to revolve about boiler 15. The partitions 22 extend upward, so that their upper edges are flush with the upper edge of boiler 15. Thus it will be seen that when platform 19 is in place, closed compartments are provided between the partitions, the platform, and a cover 23 (Fig. 5) with which the whole is surmounted. The cover 23 is provided with a ring or handle 24 at its center, and with notches 25 in its periphery. The casing 1 is provided with internal lugs 26 corresponding with notches 25 in the cover. Cover 23 is inserted in such a way that notches 25 pass over lugs 26. The cover is then pressed down and slightly rotated till notches 25 are out of alinement with the lugs and the lugs bear upon the surface of the cover. It will thus be seen that cover 23 covers boiler 15 and the compartments between partitions 22 closely and holds the boiler and the partitions down in place. Cover 23 is also provided with a cylindrical flange 27 which seals boiler 15.

The casing 1 is provided with a door, 28, through which access may be had to the compartments between partitions 22. By revolving platform 19, each of the compartments may be brought to the door. A casserole 29 is provided for each of the compartments, preferably formed as shown. Into these the foods of different kinds are placed. They are preferably made of aluminum or other suitable metal that will not readily tarnish, and that will have a neat appearance upon the table, so that the food need not be taken out of the casseroles and placed upon other dishes, thus disturbing its original arrangement and garnishes. The casseroles may be slipped out successively through door 28 and placed upon the table. They may be all taken out together, or, if the meal is to be served in courses, each may be taken out when required and the food thus kept in proper condition till wanted.

Liquids, such as soup and consomme, are placed in a receptacle within boiler 15 and may be reached by removing the upper section and cover 23. We have thus described the section for articles to be kept hot.

The refrigerating section 3 has a double wall, with nonconducting packing, similar to the wall of division 2. The bottom, also, is double and packed in a similar manner. A platform, 19, with partitions, 22, is also provided here, as well as a door 28 and casseroles 29. A cover 23 is also provided. In this case, however, the cover 23 has its center perforated to receive the neck of a bottle for beverage which may be placed in cup 16. The space between cup 16 and cup 15 in this case is filled with ice. In this case heat from the compartments and the casseroles is absorbed by the cold wall of cup 15, and the victuals within the casseroles are kept cold. The casseroles are removed and inserted in the same way as those from division 2. Access to receptacle 16 is had by removing lid 4 and cover 23.

The construction and use of our improved apparatus is now obvious, so that any one skilled in the art pertaining thereto may make and use it.

We claim—

1. Apparatus for serving meals comprising a plurality of sections, one of said sections provided with a source of heat, and being accessible by a door in the side thereof, a second section having insulated walls, adapted to prevent the radiation of heat, integral with last named section, a door in the side of said second section, compartments in said second section adapted to be brought into operative relation with said door; a third section, having insulated walls, detachably secured to said second section and adapted to serve as a lid therefor, a door in the side of said third section, compartments adapted to be brought into operative relation with said door, and a lid for said section.

2. Apparatus for serving meals comprising a plurality of sections, certain of said sections having insulated walls adapted to prevent the radiation of heat, one of said sections provided with a source of heat and being accessible by a door in the side thereof, a second section, integral with the last named section, a door in the side of said second section, radial compartments adapted to be brought into operative relation to said door and be accessible both from the top and through said door, a central compartment accessible only from the top, a cover for said compartments; a third section detachably secured to said second section, and adapted to serve as a lid therefor, a door in the side of said third section, radial compartments adapted to be brought into operative relation to said door, a central compartment accessible only from the top, a cover for said compartments, and a lid for said section.

JACOB STRAUB.
HERMAN STEINHILBER.

Witnesses:
M. C. ROLLWAGE,
D. B. MEDANICH.